US008918222B2

(12) United States Patent
Higuchi et al.

(10) Patent No.: US 8,918,222 B2
(45) Date of Patent: Dec. 23, 2014

(54) CONTROLLING AND PROTECTING POWER-SUPPLY PATHS FROM THERMAL OVERLOADS

(75) Inventors: Yutaka Higuchi, Yokkaichi (JP); Seiji Takahashi, Yokkaichi (JP); Yuuki Sugisawa, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 499 days.

(21) Appl. No.: 13/259,596
(22) PCT Filed: Mar. 30, 2010
(86) PCT No.: PCT/JP2010/055635
§ 371 (c)(1),
(2), (4) Date: Sep. 23, 2011
(87) PCT Pub. No.: WO2010/113916
PCT Pub. Date: Oct. 7, 2010

(65) Prior Publication Data
US 2012/0022708 A1  Jan. 26, 2012

(30) Foreign Application Priority Data
Mar. 31, 2009  (JP) ................................ 2009-087534

(51) Int. Cl.
*G06F 19/00* (2011.01)
*H02J 7/00* (2006.01)
*H02H 3/08* (2006.01)
*H02J 9/00* (2006.01)

(52) U.S. Cl.
CPC .............. *H02J 7/0031* (2013.01); *H02H 3/085* (2013.01); *H02J 9/002* (2013.01); *H02J 9/005* (2013.01)
USPC ........... 700/293; 700/284; 700/292; 700/297; 323/311; 323/284; 361/103; 361/92

(58) Field of Classification Search
USPC ........ 323/311, 284, 222, 282; 361/88, 90, 92, 361/103
See application file for complete search history.

(56) References Cited

U.S. PATENT DOCUMENTS 3,702,921 A * 11/1972 Thelen .......................... 219/501
4,432,030 A *  2/1984 Briccetti ....................... 700/293

(Continued)

FOREIGN PATENT DOCUMENTS

| CN | 1901312 A | 1/2007 |
| JP | A-2001-217696 | 8/2001 |
| JP | A-2002-362393 | 12/2002 |

OTHER PUBLICATIONS

Micrel, "MIC2561-PCMCIA Card Socket Vcc and Vpp Switching Matrix-Final Information", Jan. 2005, Retrieved from the Internet at "www.micrel.com".*

(Continued)

*Primary Examiner* — Mohammad Ali
*Assistant Examiner* — Kelvin Booker
(74) *Attorney, Agent, or Firm* — Oliff PLC

(57) ABSTRACT

A power supply controller is connected between a power source and a power-supply path, and includes a switch circuit, a power-supply path protection circuit, and a sleep mode setting circuit. The switch circuit is configured to permit and inhibit power supply from the power source to the load. The protection circuit controls switching operation of the switch circuit according to a power-supply command signal commanding start or stop of the power supply to the load, calculates a temperature of the power-supply path regardless of whether power is supplied to the load, do not calculate the temperature of the power-supply path in a sleep mode, and inhibits power supply to the switch circuit according to the calculated temperature reaching an upper limit. The sleep mode setting circuit sets the power supply controller to the sleep mode according to the power-supply path satisfying a temperature condition.

8 Claims, 2 Drawing Sheets

(56) References Cited

U.S. PATENT DOCUMENTS

| | | | |
|---|---|---|---|
| 5,729,061 A * | 3/1998 | Narita | 700/293 |
| 6,089,456 A * | 7/2000 | Walsh et al. | 235/472.01 |
| 6,222,355 B1 * | 4/2001 | Ohshima et al. | 323/282 |
| 7,321,213 B2 | 1/2008 | Kobayashi et al. | |
| 7,843,088 B2 * | 11/2010 | Perper et al. | 307/140 |
| 7,848,104 B2 * | 12/2010 | Shinohara | 361/695 |
| 8,232,685 B2 * | 7/2012 | Perper et al. | 307/140 |
| 8,514,537 B2 * | 8/2013 | Higuchi et al. | 361/103 |
| 8,575,785 B2 * | 11/2013 | Perper et al. | 307/140 |
| 2007/0035896 A1 | 2/2007 | Kobayashi et al. | |
| 2009/0224603 A1 * | 9/2009 | Perper et al. | 307/43 |
| 2010/0001718 A1 * | 1/2010 | Howard et al. | 324/207.15 |
| 2010/0238627 A1 * | 9/2010 | Shinohara | 361/695 |
| 2011/0037324 A1 * | 2/2011 | Perper et al. | 307/140 |
| 2012/0007591 A1 * | 1/2012 | Howard et al. | 324/207.15 |
| 2012/0081825 A1 * | 4/2012 | Nakamura et al. | 361/93.8 |
| 2012/0176115 A1 * | 7/2012 | Higuchi et al. | 323/311 |
| 2012/0182004 A1 * | 7/2012 | Higuchi et al. | 323/284 |
| 2012/0256489 A1 * | 10/2012 | Perper et al. | 307/43 |
| 2013/0293004 A1 * | 11/2013 | Higuchi et al. | 323/284 |
| 2014/0062190 A1 * | 3/2014 | Perper et al. | 307/24 |

OTHER PUBLICATIONS

Micrel, "MIC2560-PCMIA Card Socket Vcc and Vpp Switching Matrix", Sep. 2006, Retrieved from the Internet at "www.micrel.com".*

National Semiconductor, "LMD18400-Quad High Side Driver", Jun. 1996, Retrieved from the Internet at "www.national.com".*

Ricoh, "R5534V-PCMCIA Power Controller", May 2005, Retrieved from the Internet at "www.ricoh.com".*

Analog Devices, "1.8V, 6 LVDS/12 CMOS Outputs, Low Power Clock Fanout Buffer-ADCLK846", 2009-2010, Analog Devices, Inc., Retrieved from the Internet at "www.analog.com".*

Linear Technology, "LTC4414, 36V, Low Loss PowerPath ™ Controller for Large PFETs", 2005, Linear Technology Corporation, retrieved from the Internet at "www.linear.com".*

Marasco, K., "How to Apply Low-Dropout Regulators Successfully", Aug. 2009, Analog Dialogue 43-08 Back Burner, Retrieved from the Internet at "www.analog.com/analogdialogue".*

Panda, P.R.; Silpa, B.V.N.; Shrivastava, A. and Gummidipudi, K., "Power-Efficient System Design", 2010, X, 253p, ISBN: 978-1-4419-6387-1.*

Pop, E., "Energy Dissipation and Transport in Nanoscale Devices", 2010, Nano Research 3, 147.*

Roy, K.; Mukhopadhyay, S. and Mahmoodi-Meimand, H., "Leakage Current Mechanisms and Leakage Reduction Techniques in Deep-Submicrometer CMOS Circuits", Feb. 2003, Proceedings of the IEEE, vol. 91, No. 2.*

Patterson, J. and Dixon, J., "White Paper: Optimizing Power Consumption in DSP Designs", Sep. 2006, Texas Instruments.*

Tyco Electronics, Fundamentals of PolySwitch Overcurrent and Overtemperature Devices, 2008, Tyco Electronics Corporation, Retrieved from the Internet at "circuitprotection.com".*

Patoux, J., "Ask the Applications Engineer-37, Low-Dropout Regulators", May 2007, Analog Dialogue 41-05, Retrieved from the Internet at "www.analog.com/analogdialogue".*

Wolbert, B., "Micrel's Guide to Designing With Low-Dropout Voltage Regulators", Dec. 1998, Micrel Semiconductor.*

Notification of the First Office Action dated Aug. 19, 2013 from Chinese Patent Application No. 201080014620.0 (with English-language translation).

International Search Report in International Application No. PCT/JP2010/055635; dated Jun. 29, 2010 (with English-language translation).

Written Opinion of the International Searching Authority in International Application No. PCT/JP2010/055635; dated Jun. 29, 2010 (with partial English-language translation).

Notification of Reasons for Refusal dated Jun. 20, 2013 from Japanese Patent Application No. 2009-087534 (with English-language translation).

Wolbert; *Micrel's Guide to Designing With Low-Dropout Voltage Regulators*; Dec. 31, 1998; Revised Edition.

Notification of the Second Office Action dated Mar. 24, 2014 from Chinese Patent Application No. 201080014620.0 (with English-language translation).

Sep. 15, 2014 Office Action issued in Chinese Patent Application No. 201080014620.0 (with translation).

* cited by examiner

CONTROLLING AND PROTECTING POWER-SUPPLY PATHS FROM THERMAL OVERLOADS

TECHNICAL FIELD

The present invention relates to a power supply controller and a control method thereof, especially to a technology for protecting a power-supply path to a load in the power supply controller having a sleep mode.

BACKGROUND ART

A power supply controller having the following configuration is known. In a power-supply path that connects a load to a power source, a high-power semiconductor switch such as a power MOSFET is provide to control an amount of current to the load by turning on and off the semiconductor switch. With this configuration, the power-supply path to the load is protected against an overcurrent. When an excessive current flows in such a power supply controller, a potential at a control terminal of the semiconductor switch is adjusted by a control circuit. Namely, the semiconductor switch is turned off and the current is shut off (see Patent Document 1).

If the power supply controller is used as a power supply controller for a vehicle, it is set to a power saving mode (sleep mode) when no instruction for driving the load is issued so that a battery can be kept from running out. In the sleep mode, functions of the power supply controller are usually halted except for a sleep-mode cancellation function.

Patent Document 1: Japanese Unexamined Patent Publication.

DISCLOSURE OF THE INVENTION

Problem to be Solved by the Invention

The inventors of this application have invented a method for protecting a power-supply path by a power supply controller having the above configuration based on temperatures detected in the power-supply path. The method includes detecting an electrical current and calculating a temperature based on heat generation in the power-supply path due to the electrical current and heat dissipation from the power-supply path. However, most of functions of the power supply controller is halted in the sleep mode. Therefore, the temperature in the power-supply path may not be properly calculated and thus the power-supply path may not be properly protected.

The present invention was made in view of the foregoing circumstances. An object of the present invention is to provide a power supply controller having a sleep mode and configured to properly protecting a power-supply path and a method for controlling the power supply controller.

Means for Solving the Problem

The present invention was made in view of the foregoing circumstances. A power supply controller of the present invention is connected to a power-supply path for supplying power from a power source to a load for controlling power supply from the power source to the load. The power supply controller has a sleep mode in which current consumption thereof is reduced. The power supply controller includes a switch circuit, a power-supply path protection circuit, and a sleep mode setting circuit. The switch circuit is connected between the power source and the power-supply path. The switch circuit is configured to permit and inhibit the power supply from the power source to the load. The power-supply path protection circuit is configured to control switching operation of the switch circuit according to a power-supply command signal commanding any one of start and stop of the power supply to the load. The power-supply path protection circuit is configured to calculate a temperature of the power-supply path regardless of whether power is supplied to the load and not to calculate the temperature of the power-supply path in the sleep mode. The power-supply path protection circuit is configured to inhibit power supply to the load by the switch circuit according to the calculated temperature reaching a predetermined upper limit to protect the power-supply path. The sleep mode setting circuit is configured to set the power supply controller to the sleep mode according to the temperature of the power-supply path satisfying a predetermined temperature condition.

A method of the present invention relates to controlling a power supply controller having a sleep mode in which current consumption is reduced and a switch circuit for permitting and inhibiting power supply from a power source to a load, and connected to a power-supply path for supplying power from the power source to the load for controlling power supply from the power source to the load. The method includes: calculating a temperature of the power-supply path regardless of whether the power is supplied to the load; inhibiting the power supply to the load by the switch circuit according to the calculated temperature of the power-supply path reaching a predetermined upper limit; and setting the power supply controller to the sleep mode according to the temperature of the power-supply path satisfying a predetermined temperature condition.

If the temperature of the power supply path satisfies the predetermined temperature condition, the power supply controller is transitioned in the sleep mode. If the temperature of the power-supply path does not satisfy the temperature condition, the power supply controller is not transitioned in the sleep mode even when the power supply to the load is stopped. Namely, even when the power supply to the load is stopped, the power supply controller continues to calculate the temperature of the power-supply path. Therefore, the temperature of the power-supply path is properly estimated. As a result, the power-supply path can be properly protected by the power supply controller having the sleep mode.

EXPLANATION OF REFERENCE CHARACTERS

Figure 1:
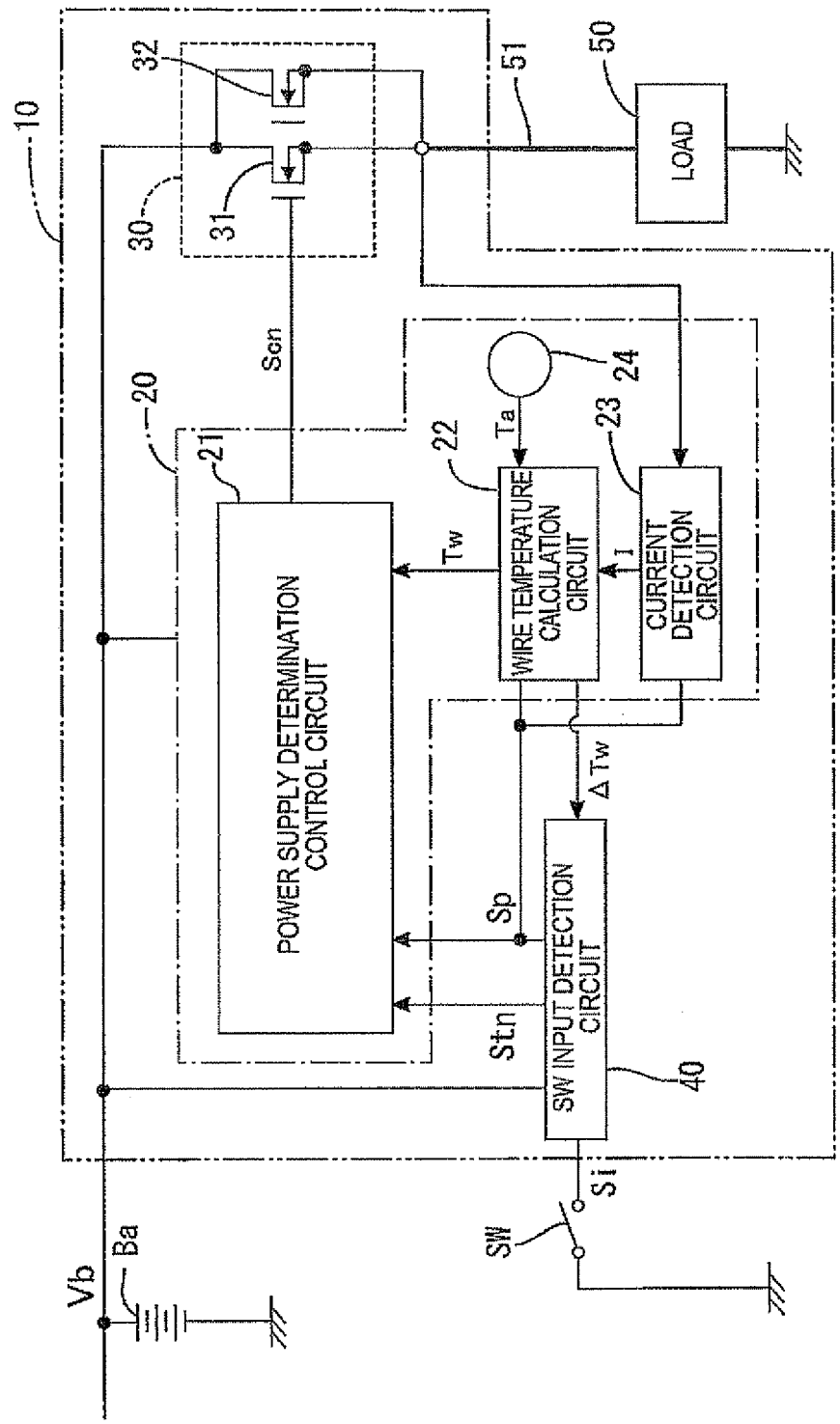
FIG. 1 is a block diagram illustrating a general configuration of a power supply controller according to an aspect of the present invention.

10 . . . Power supply controller
20 . . . Power-supply path protection circuit
21 . . . Power supply determination control circuit
22 . . . Wire temperature calculation circuit
23 . . . Current detection circuit (Current detector)
24 . . . Ambient temperature sensor (Temperature detector)
30 . . . Switch circuit
31 . . . Main switch (Switch circuit)
32 . . . Sense transistor (Current detector)
40 . . . SW input detection circuit (Sleep mode setting circuit)
I . . . Supply current
Ta . . . Ambient temperature
Tth . . . Threshold temperature Tw . . . Power-supply path temperature (Wire temperature)
ΔTw . . . Increase in power-supply path temperature
ΔT_lower . . . Temperature increase for determination (Predetermined temperature)

BEST MODE FOR CARRYING OUT THE INVENTION

<Illustrative Aspect>

Figure 2:
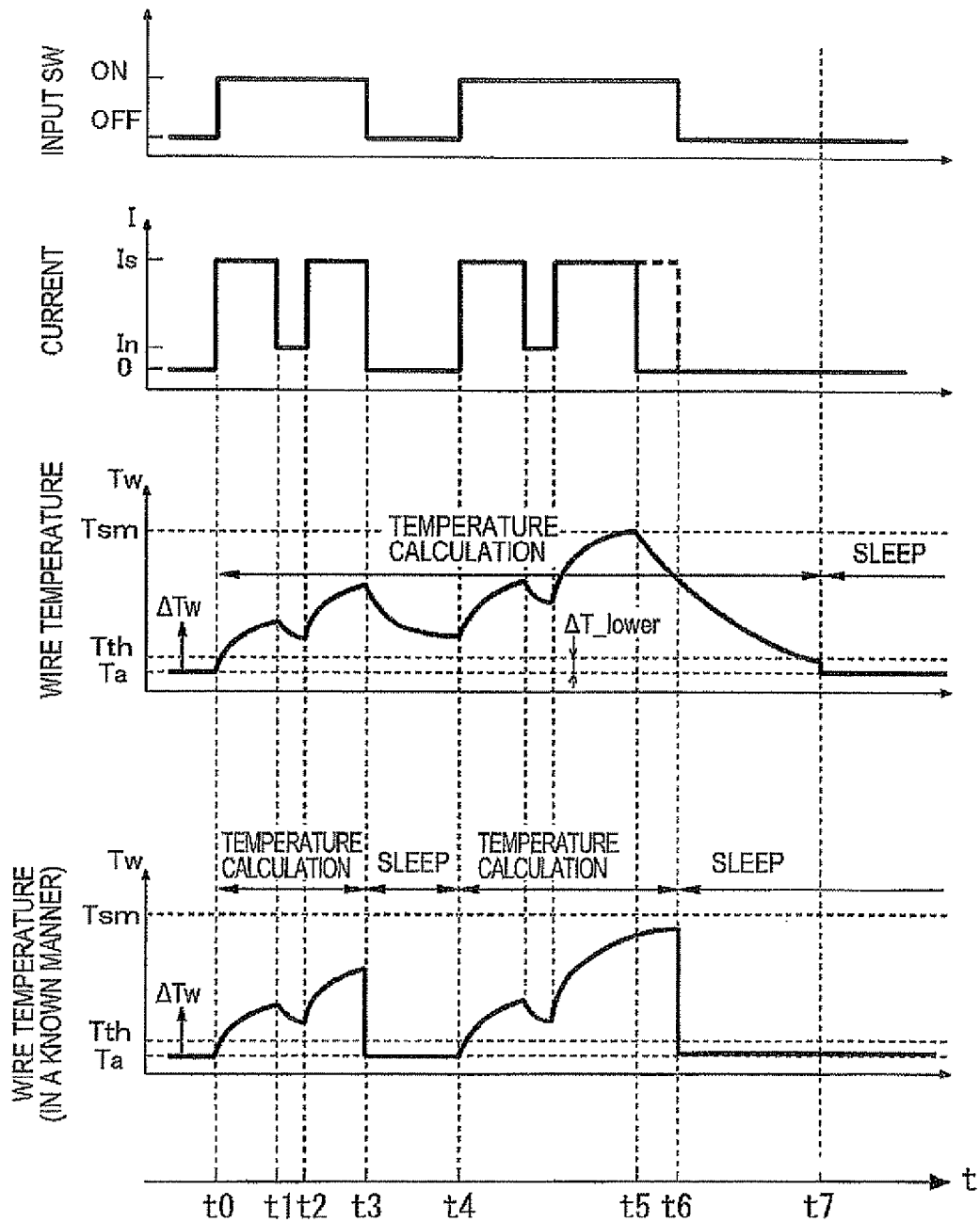
FIG. 2 is a timing diagram schematically illustrating variations in signals over time according to the aspect.

The one aspect of the present invention will be explained with reference to FIGS. 1 and 2. FIG. 1 is a block diagram illustrating a general configuration of a power supply controller 10 according to an aspect of the present invention. FIG. 2 is a timing diagram schematically illustrating variations in signals over time according to the aspect.

1. Circuit Configuration

As illustrated: in FIG. 1, the power supply controller 10 is arranged between a power source Ba and a load 50, and connected to a power-supply line (a power-supply path) 51 for supplying power from the power source Ba to the load 50. The power supply controller 10 is configured to control power supply from the power source Ba to the load 50. The power supply controller 10 has a sleep mode that is an operation mode in which current consumption thereof is reduced.

The power supply controller 10 includes a switch (SW) input detection circuit (an example of a sleep-mode setting circuit) 40, a switch circuit 30, and a power-supply path protection circuit 20.

In this aspect, the power supply controller 10 is used in a vehicle engine compartment. The power source Ba is a battery. The load 50 is a motor, for example, driven and controlled by the power supply controller 10 via the power-supply path 51, which is an electrical wire. In FIG. 1, a battery voltage Vb is directly applied to the switch circuit 30. The battery voltage Vb is converted to predetermined voltages by a voltage converter (not shown) and applied to the power-supply path protection circuit 20 and the SW input detection circuit 40.

The aspects of the present invention are not limited to the power supply controller of this aspect. The technology can be applied to any power supply controller having a sleep mode and configured to control power supply to loads to protect power supply lines.

The SW input detection circuit 40, which is a sleep-mode setting circuit, is connected to an input switch SW. When the input switch SW is turned on, the SW input detection circuit 40 receives an input signal (a power-supply command signal) Sin commanding a start of power supply to the load 50 and generates an output command signal (a power-supply command signal) Stn. Namely, in this aspect, an instruction for starting the power supply to the load 50 is issued when the input switch SW is turned on. In FIG. 1, the SW input detection circuit 40 receives a low input signal Sin when the input switch SW is turned on.

When the input switch SW is turned off, the SW input detection circuit 40 receives an input signal Sin that is an instruction for stopping the power supply to the load 50. In FIG. 1, the SW input detection circuit 40 receives a high input signal Sin when the input switch SW is turned off. Namely, a terminal (not shown) of the SW input detection circuit 40 through which the input signal Sin is input is pulled up.

After the input switch SW is turned off and an increase ΔTw in temperature of the power-supply path 51 (hereinafter referred to as "the increase in wire temperature") from an ambient temperature Ta is equal to or lower than a predetermined temperature increase ΔT_lower, the SW input detection circuit 40 generates a sleep mode signal Sp. The SW input detection circuit 40 sends the sleep mode signal Sp to circuits in the power supply controller 10 so that the power supply controller 10 is set to the sleep mode (in a sleep state).

Even while the power supply controller 10 is in the sleep state, the SW input detection circuit 40 is still able to receive the input signal Sin that is an instruction for starting the power supply to the load 50. The SW input detection circuit 40 has a function for activating the power supply controller 10 from the sleep state according to a reception of the input signal Sin, that is, a wake-up function.

The switch circuit 30 is connected between the battery Ba and the power-supply path 51. The switch circuit 30 starts and stops the power supply from the battery Ba to the load 50 according to a power supply control signal Scn from the power-supply path protection circuit 20. The switch circuit 30 is configured as a semiconductor switch including a main switch 31 and a sense transistor (a current detector) 31. The main switch 31 is provided for supplying power to the load 50. The sense transistor 32 is provided for detecting a load current (a supply current). As illustrated in FIG. 1, the main switch 31 and the sense transistor 32 are N-channel field effect transistors (FETs).

The power-supply path protection circuit 20 includes a power supply determination control circuit 21, a wire temperature calculation circuit 22, a current detection circuit (a current detector) 23, and en ambient temperature sensor (a temperature detector) 24. The power-supply path protection circuit 20 turns on the switch circuit 30 according to the power-supply command signal Stn. The power-supply path protection circuit 20 turns off the switch circuit 30 to protect the power-supply path 51 when the temperature Tw of the power-supply path 51 reaches a predetermined upper limit Tsm.

The current detector includes the current detection circuit 23 and the sense transistor 32. The current detector detects a load current I that flows into the power-supply path 51 via the switch circuit 30. The current detection circuit 23 calculates the load current I by multiplying a sense current, which is detected by the sense transistor 32, by a predetermined number. Information on a supply current I is sent to the wire temperature calculation circuit 22.

The ambient temperature sensor 24 is arranged near the wire temperature calculation circuit 22 and configured to detect an ambient temperature Ta in the vehicle engine compartment. Information on the ambient temperature Ta is sent to the wire temperature calculation circuit 22.

The wire temperature calculation circuit 22 calculates an increase ΔTw in the wire temperature from the ambient temperature Ta based on heat generation in the power-supply path 51 due to the current I and heat dissipation from the power-supply path 51 in a normal operation mode other than the sleep mode. This calculation is performed whether the current I is present or not. The wire temperature calculation circuit 22 then calculates a temperature Tw of the power-supply path (hereinafter referred to as "wire temperature") by adding the increase ΔTw to the ambient temperature Ta. The wire temperature calculation circuit 22 sends the calculated increase ΔTw in the wire temperature to the SW input detection circuit 40, and the information on the wire temperature Tw to the power supply determination control circuit 21.

The wire temperature calculation circuit 22 samples the current I for every predetermined time period Δt, and calculates the increase ΔTw in the wire temperature by substituting the current I into the following equation (1).

$$\Delta Tw(n) = \Delta Tw(n-1) \times \exp(-\Delta t/\tau w) + Rthw \times Rw(n-1) \times I(n-1)^2 \times [1-\exp(-\Delta t/\tau w)] \quad (1)$$

where,

I(n): Detected current (A) in the $n^{th}$ detection (n is an integer equal to or larger than 1)

$\Delta$Tw(n): Increase (° C.) in the wire temperature in the $n^{th}$ detection Rw(n)=Rw(0)×[1+κw×(Tw−To); Wire resistance ($\Omega$) in the $n^{th}$ detection Rw(0): Wire resistance ($\Omega$) at a predetermined reference temperature To.

Rthw: Thermal resistance of the wire (° C./W)

τW: Thermal time constant of the wire (° C.).

κw: Resistance-temperature coefficient of the wire (/° C.)

In equation (1), the first term excluding the current I indicates the heat dissipation from the power-supply path 51, and the second term including the current I indicates the heat generation in the power-supply path 51. When the current supplied to the load 50 is shut off and no current I is present, the wire temperature Tw is determined based on the heat dissipation from the power-supply path 51.

The power supply determination control circuit 21 controls on and off of the switch circuit 30 according to the power-supply command signal Stn from the SW input detection circuit 40. When the wire temperature Tw reaches the predetermined upper limit Tem, the power supply determination control circuit 21 turns off the switch circuit 30. The upper limit Tem of the wire temperature Tw corresponds to a smoke point at which the wire starts to smoke. When the wire temperature reaches the smoke point Tsm, the power supply determination control circuit 21 turns off the main switch 31 of the switch circuit 30 and inhibits supplying the power to the load 50 to protect the power-supply path 51.

2. Operation of the Power Supply Controller

Next, operation of the power supply controller 10 of this aspect will be explained with reference to the timing diagram in FIG. 2.

During a halt of the load (or the motor) 50, assume that the input switch SW is turned on at time to in FIG. 2 to resume the power supply to the load 50. In response to the closing of the input switch SW, the SW input detection circuit 40 activates the power supply controller 10 by the wake-up function. The SW input detection circuit 40 sends the output command signal (the power-supply command signal) Stn to the power supply determination control circuit 21.

The power supply determination control circuit 21 generates the power supply control signal Scn that is an instruction for turning on the main switch 31 of the switch circuit 30 according to the output command signal Stn to turns on the main switch 31. According to the power supply control signal Scn, the current I is supplied from the battery Ba to the load 50. As a result, the wire temperature Tw increases from the ambient temperature Ta.

Namely, the sense transistor 32 and the current detection circuit 23 detect the load current I according to the power-supply instruction for supplying power to the load 50, and the ambient temperature sensor 24 detects the ambient temperature Ta (a detecting step). The wire temperature calculation circuit 22 calculates the increase $\Delta$Tw in the wire temperature from the ambient temperature using equation 1, and calculates the wire temperature Tw by adding the increase $\Delta$Tw to the ambient temperature Ta (a calculating step).

In FIG. 2, two different currents I, a short-circuit current Is and a normal current In, are shown. The short-circuit current Is is measured when the power-supply path 51 is shorted. The normal current In is measured when the power-supply path 51 is in a normal condition. In FIG. 2, the short circuit in the power-supply path 51 is present at time t0.

When the short circuit in the power-supply path 51 is resolved at time t1 in FIG. 2, the current. I decreases from the short-circuit current Is to the normal current In. At that time, an amount of heat dissipation from the power-supply path 51 is larger than an amount of heat generation due to the current I. Therefore, the calculated wire temperature Tw decreases.

When the current I increases again from the normal current In to the short-circuit current Is at time t2 in FIG. 2, the wire temperature Tw also increases. When the input switch SW is turned off at time t3 in FIG. 2, the SW input detection circuit 40 sends the output command signal Stn to the power supply determination control circuit 21 to stop supplying the current I. The power supply determination circuit 21 generates the power supply control signal Scn to turn off the main switch 31 according to the output command signal Stn. The main switch 31 is turned off according to the power supply control signal Scn. As a result, the current I supplied to the load is shut off, and the calculated wire temperature Tw decreases.

A graph at the bottom of FIG. 2 illustrates variations in the wire temperature Tw in known sleep mode transition that the power supply controller 10 enters immediately after the input switch SW is turned off. When the power supply controller 10 enters a known sleep mode and the input switch SW is turned off, the wire temperature calculation circuit 22 stops the calculation of the wire temperature Tw. As illustrated in FIG. 2, the increase $\Delta$Tw in the wire temperature is reset and the wire temperature Tw is set to the ambient temperature Ta. In this aspect, the power supply controller 10 does not enter the sleep mode simultaneously with the turning off of the input switch SW. Therefore, even when the input switch SW is turned off, the wire temperature calculation circuit 22 continues to calculate the wire temperature Tw and the increase $\Delta$Tw in the wire temperature.

When the input switch SW is turned on again at time t4 in FIG. 2, the input detection circuit 40 sends the output command signal Stn for starting the current I to flow to the power supply determination control circuit 21 similarly to the operation at time t0. The power supply determination control circuit 21 turns on the main switch 31 according to the output command signal Stn. The wire temperature Tw calculated based on the current I increases from the wire temperature Tw at time t4.

In case of the known sleep mode transition, the wire temperature Tw increases from the ambient temperature Ta. The wire temperature calculation circuit 22 determines that the wire temperature Tw is equal to the ambient temperature Ta at time t4 even though an actual wire temperature Tw is higher than the ambient temperature Ta at time t4. Based on the determination, the wire temperature calculation circuit 22 starts calculation of the wire temperature Tw.

In this aspect, when the wire temperature Tw reaches the smoke point Tsm of the wire at time t5 in FIG. 2, the power supply determination circuit 21 turns off the main switch 31 even when the input switch SW is turned on (a inhibiting step). Namely, the power supply determination circuit 21 stops the power supply to the load 50 to protect the power-supply path 51. Because the power supply is stopped, the wire temperature Tw decreases and thus the power-supply path 51 does not reach actual smoke. The power-supply path 51 is properly protected.

In the calculation of the wire temperature Tw according to the known sleep mode transition, the calculated wire temperature Tw at time t5 is lower than the smoke point Tsm of the wire. Therefore, the current I indicated by dotted lines in FIG. 2 continues to flow until, time t6 at which the input switch SW is turned off. Namely, the power supply controller 10 may continue feeding the flow current I based on the wire temperature Tw calculated according to the known sleep mode transition although the actual wire temperature Tw has reached the smoke point Tsm of the wire.

In this aspect, when the wire temperature Tw decreases to the predetermined temperature Tth or lower and the increase $\Delta Tw$ in the wire temperature is equal to or less than the increase $\Delta T\_lower$ for the determination (corresponding to "a predetermined temperature"), the SW input detection circuit 40 generates the sleep mode signal Sp and sets the power supply controller 10 to the sleep mode (a setting step).

In this aspect, the threshold temperature Tth is set by adding a predetermined temperature (the increase $\Delta T\_lower$ for the determination) to the ambient temperature Ta. The increase $\Delta T\_lower$ for the determination is set according to the setting conditions of the power supply controller 10. With this configuration, timing for setting the power supply controller 10 to the sleep mode is adjustable. Namely, a balance between power saving and reliability of wire protection is adjustable. If the reliability of wire protection is more considered, the threshold temperature Tth is set to a temperature near the ambient temperature Ta. Namely, a predetermined additional temperature (the increase $\Delta T\_lower$ for the determination) is set to a small value, for example, between 0.1° C. and 5° C.

3. Effect of this Aspect

In, this aspect, the increase $\Delta Tw$ in the wire temperature is included in conditions for transitioning into the sleep mode of the power supply controller 10. Even when the input switch SW is turned off, the power supply controller 10 does not enter the sleep mode if the increase $\Delta Tw$ in the wire temperature is greater than the increase $\Delta T\_lower$ for the determination (the wire temperature Tw is higher than the threshold temperature Tth). The wire temperature calculation circuit 22 continues calculating the wire temperature Tw. Therefore, even when start and stop of the power supply to the load 50 are repeated in a relatively short period and the wire temperature Tw does not decrease to the ambient temperature Ta, the wire temperature Tw is properly calculated. Therefore, the power-supply path 51 is properly protected. Namely, the power-supply path 51 is properly protected by the power supply controller 10 having the sleep mode.

The threshold temperature Tth is set by adding the predetermined temperature increase $\Delta T\_lower$ to the ambient temperature Ta. The temperature increase $\Delta T\_lower$ can be set according to the setting conditions of the power supply controller 10. Namely, the balance between the power saving and the reliability of wire protection in the power supply controller 10 is adjustable.

<Other Aspects>

The present invention is not limited to the above aspect explained in the above description with reference to the drawings. The following aspects may be included in the technical scope of the present invention, for example.

(1) In the above aspect, the threshold temperature Tth is set by adding the predetermined temperature (the increase $\Delta T\_lower$ for the determination) to the ambient temperature Ta. However, the threshold temperature Tth can be set differently. The threshold temperature Tth may be set to a constant temperature that does not depend on the ambient temperature Ta. With such a threshold temperature Tth, the reliability of wire protection can be achieved.

(2) In the above aspect, the current detector includes the current detection circuit 23 and the sense transistor 32. However, the current detector can be configured differently. For example, the supply current may be detected using a shunt resistor. Alternatively, the current may be detected based on a drain-source voltage Vds of the main switch (the N-channel FET).

(3) In the above aspect, the sleep mode setting circuit is used as the SW input detection circuit 40. However, the sleep mode setting circuit may be provided separately from the SW input detection circuit 40.

(4) In the above aspect, the circuits in the power supply controller 10 are provided as separate circuits. However, the power supply controller 10 may have different configurations. For example, the power-supply path protection circuit 20 without the ambient temperature sensor 24 and the SW input detection circuit 40 may be provided by an application specific integrated circuit (ASIC).

The invention claimed is:

1. A power supply controller connected to a power-supply path for supplying power from a power source to a load for controlling power supply from the power source to the load, and having a sleep mode in which current consumption is reduced, comprising:
   a switch input detection circuit configured to generate a power-supply command signal commanding any one of start and stop of the power supply from the power source to the load;
   a switch circuit connected between the power source and the power-supply path and configured to permit and inhibit the power supply from the power source to the load;
   a power-supply path protection circuit configured to control switching operation of the switch circuit according to the power-supply command signal, to calculate a temperature of the power-supply path regardless of whether power is supplied to the load, not to calculate the temperature of the power-supply path in the sleep mode, to determine whether the calculated temperature of the power-supply path reaches an upper limit, and to inhibit power supply to the load by the switch circuit according to the calculated temperature reaching the upper limit to protect the power-supply path; and
   a sleep mode setting circuit configured to determine whether the temperature of the power-supply path satisfies a temperature condition independent of the upper limit and to set the power supply controller to the sleep mode according to a result of the determination indicating the temperature of the power-supply path satisfying the temperature condition.

2. The power supply controller according to claim 1, wherein the temperature condition is that the temperature of the power-supply path decreases to a threshold temperature after the power-supply path protection circuit receives the power-supply command signal commanding the stop of the power supply to the load.

3. The power supply controller according to claim 2, wherein the threshold temperature is set by adding a predetermined temperature to the ambient temperature.

4. The power supply controller according to claim 1, wherein the power-supply path protection circuit includes:
   a current detector configured to detect a current flowing through the load;
   a temperature detector configured to detect an ambient temperature;
   a wire temperature calculation circuit configured to calculate an increase in temperature of the power-supply path from the ambient temperature based on a difference between heat generation in the power-supply path due to the current flowing through the power-supply path and heat dissipated from the power-supply path, and to calculate a temperature of the power-supply path by adding the increase in temperature of the power-supply path to the ambient temperature; and a power supply determination control circuit configured to control turn-on and turn-off of the switch circuit according to the power-supply command signal, and to turn off the switch circuit according to the temperature of the power-supply path reaching the upper limit.

5. A method for controlling a power supply controller connected to a power-supply path for supplying power from a power source to a load for controlling power supply from the power source to the load, and having a switch circuit configured to permit and inhibit the power supply from the power source to the load and a sleep mode in which current consumption is reduced and, comprising:

calculating a temperature of the power-supply path regardless of whether the power is supplied to the load;

determining whether the calculated temperature of the power-supply path reaches an upper limit;

inhibiting the power supply to the load by the switch circuit according to the calculated temperature of the power-supply path reaching the upper limit;

determining whether the temperature of the power-supply path satisfies a temperature condition independent of the upper limit; and setting the power supply controller to the sleep mode according to a result of the determination indicating the temperature of the power-supply path satisfying the temperature condition.

6. The method for controlling the power supply controller according to claim 5, wherein the temperature condition is that the temperature of the power-supply path decreases to a threshold temperature after a power-supply command signal commanding the stop of the power supply to the load is received.

7. The method for controlling the power supply controller according to claim 6, wherein the threshold temperature is set by adding a predetermined temperature to the ambient temperature.

8. The method for controlling the power supply controller according to claim 5, further comprising:

generating a power-supply command signal commanding a start of the power supply to the load;

detecting a current flowing through the load and an ambient temperature according to the power-supply command signal detecting heat generation in the power-supply path due to the current flowing through the power-supply path; and detecting heat dissipation from the power-supply path, wherein the calculating includes calculating:

a difference between the heat generation and the heat dissipation;

an increase in the temperature of the power-supply path from the ambient temperature based on the difference between the heat generation and the heat dissipation; and a temperature of the power-supply path by adding the increase in temperature of the power-supply path to the ambient temperature.

* * * * *